(12) United States Patent
Deedwaniya et al.

(10) Patent No.: US 9,391,942 B2
(45) Date of Patent: Jul. 12, 2016

(54) SYMBOLIC VARIABLES WITHIN EMAIL ADDRESSES

(71) Applicant: International Business Machines Corporation, Armonk, NY (US)

(72) Inventors: Anuja Deedwaniya, Poughkeepsie, NY (US); Thomas E. Murphy, Jr., Hopewell Junction, NY (US); Mark A. Nelson, Poughkeepsie, NY (US); Kevin H. Peters, Germantown, NY (US); Louis R. Ruggiero, Sandy Hook, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 295 days.

(21) Appl. No.: 14/056,006

(22) Filed: Oct. 17, 2013

(65) Prior Publication Data

US 2015/0113071 A1    Apr. 23, 2015

(51) Int. Cl.
| | |
|---|---|
| G06F 15/16 | (2006.01) |
| G06F 17/30 | (2006.01) |
| H04L 12/58 | (2006.01) |
| G06Q 10/10 | (2012.01) |
| G06Q 50/00 | (2012.01) |

(52) U.S. Cl.
CPC ............ *H04L 51/28* (2013.01); *G06F 17/3043* (2013.01); *G06Q 10/107* (2013.01); *G06Q 50/01* (2013.01)

(58) Field of Classification Search
CPC .. H04L 51/28; G06F 17/3043; G06Q 10/107; G06Q 50/01

USPC ........................ 709/206, 228; 726/4
See application file for complete search history.

(56) References Cited

U.S. PATENT DOCUMENTS

| | | | |
|---|---|---|---|
| 5,802,510 | A | 9/1998 | Jones |
| 5,893,091 | A | 4/1999 | Hunt et al. |
| 6,212,552 | B1 | 4/2001 | Biliris et al. |

(Continued)

FOREIGN PATENT DOCUMENTS

EP        1760645 A1    3/2007

OTHER PUBLICATIONS

English Abstract for Application No. EP2206326A2; published Jul. 14, 2010; Inventors: Nurmi Mikko; Applicant(s): Nokia Corp., 1 pg.

(Continued)

*Primary Examiner* — Wen-Tai Lin
(74) *Attorney, Agent, or Firm* — Cantor Colburn LLP; William A. Kinnaman, Jr.

(57) ABSTRACT

Embodiments of the disclosure relate to processing email having symbolic variables in the address. Aspects include receiving, by an email server, an email comprising an email address for an intended recipient and determining whether the email address includes a symbolic variable. Based on determining that the email address includes the symbolic variable, the symbolic variable from the email address are extracted, an email address for an additional recipient by querying a database based on the symbolic variable is identified, and the email is transmitted to the email address of the intended recipient and the email address of the additional recipient. Based on determining that the email address does not include the symbolic variable, the email is transmitted to the email address of the intended recipient.

5 Claims, 3 Drawing Sheets

(56) References Cited

U.S. PATENT DOCUMENTS

| | | | |
|---|---|---|---|
| 6,438,608 B2 | 8/2002 | Biliris et al. | |
| 6,671,695 B2 | 12/2003 | McFadden | |
| 6,721,785 B1 | 4/2004 | Raghunandan | |
| 6,944,628 B1 | 9/2005 | De Breed | |
| 7,734,696 B2 | 6/2010 | Osterberg, Jr. et al. | |
| 8,380,875 B1 | 2/2013 | Gilmour et al. | |
| 2005/0102368 A1 | 5/2005 | Forman et al. | |
| 2008/0208981 A1* | 8/2008 | Goldberg | G06Q 10/107 709/206 |
| 2009/0111447 A1 | 4/2009 | Nurmi | |
| 2009/0248819 A1* | 10/2009 | Hutchison | H04L 12/58 709/206 |
| 2010/0017478 A1 | 1/2010 | Mejia et al. | |
| 2010/0287246 A1* | 11/2010 | Klos | H04L 29/06 709/206 |
| 2011/0099239 A1 | 4/2011 | Buchheit | |
| 2012/0260188 A1 | 10/2012 | Park et al. | |
| 2012/0271957 A1* | 10/2012 | Carney | G06Q 10/107 709/228 |
| 2014/0373106 A1* | 12/2014 | Morgenroth | G06Q 10/107 726/4 |

OTHER PUBLICATIONS

Wang et al. "Selective Message Distribution with People-Tagging in User-Collaborative Environments", Proceedings of the 27th International Conference Extended Abstracts on Human Factors in Computing Systems CHI 2009, 20090923, Boston, MA; Apr. 4-9, 2009; 6 pgs.

* cited by examiner

SYMBOLIC VARIABLES WITHIN EMAIL ADDRESSES

BACKGROUND

The present disclosure relates generally to electronic mail, more particularly, to the injection and resolution of symbolic variables within email addresses.

Email traffic has grown exponentially in recent years. Worldwide, there are 144 billion emails sent each day and 3.3 billion total email accounts. It is projected that the number of accounts will grow to 4.3 billion by the end of 2016. Email is primarily used in the corporate world, and business emails are responsible for 61% of the world's email traffic. Much of the business world relies upon email for communication between people who are not in the same area, country, etc. Telephone calls, conference calls, and in-person meetings can cost both time and money. Email provides a way to exchange information between two or more people that may be located in different parts of the world with no set-up costs.

Currently, it is often difficult to locate the email addresses of individuals on the receiving end of the email. The process of manually searching for an individual's email address is inefficient and usually time consuming. This is especially true when sending an email to more than one person. Current techniques for electronic distribution and email list automation require the sender to perform the look-up and selection process of the names or email addresses of the intended recipients.

SUMMARY

According to yet another embodiment, a mail server for processing email including a processor configured to perform a method. The method includes receiving an email comprising an email address for an intended recipient and determining whether the email address includes a symbolic variable. Based on determining that the email address includes the symbolic variable, the method includes extracting the symbolic variable from the email address, identifying an email address for an additional recipient by querying a database based on the symbolic variable, and transmitting the email to the email address of the intended recipient and the email address of the additional recipient. Based on determining that the email address does not include the symbolic variable, transmitting the email to the email address of the intended recipient.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with exemplary embodiments of the disclosure, methods, systems, and computer program products for the utilizing symbolic variables within email addresses are provided. In exemplary embodiments, symbolic variables are utilized to allow a sender to send an email to one or more recipients without knowing, or having to look up, the email address of the recipients. In other embodiments, symbolic variables can be used to address an email to a known or unknown recipient based on attributes of the recipients, such as job title, skills, experience, qualifications, etc. In other embodiments, the symbolic variables may be used for automatic posting to social media and other file hosting sites. In exemplary embodiments, the methods, systems and computer program products for utilizing symbolic variables within email addresses may be configured for use on any electronic mail device, such as smartphones, tablets and computers.

Figure 1:
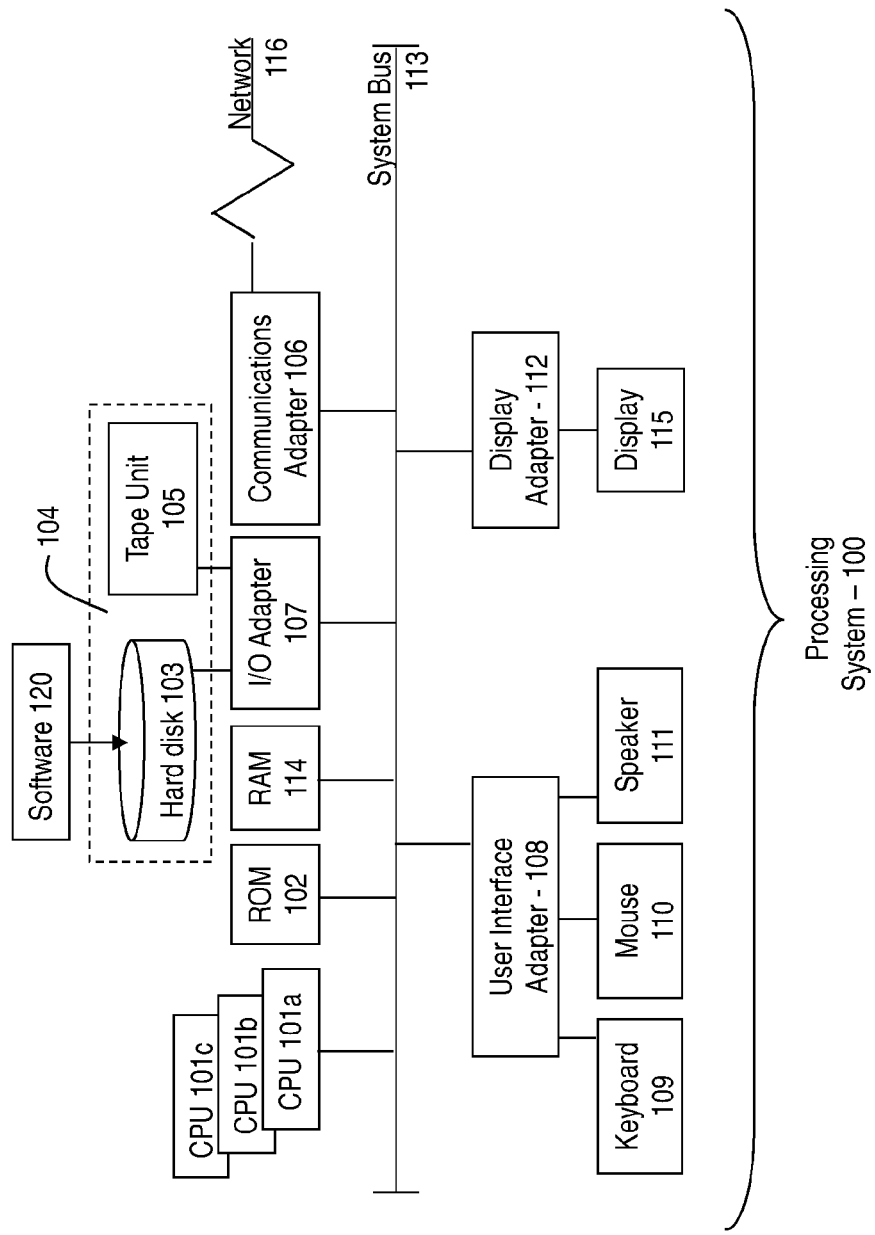
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101*a*, 101*b*, 101*c*, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Software 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

The syntax commonly used for email addresses is generally set forth in a protocol known as an Internet Message Format (IMF). Generally, the format of the email addresses is local-part@domain, wherein "local-part" may be up to 64 characters long and the "domain" name may have a maximum of 253 characters. In addition, the entire email address is restricted to no more than 254 characters. The "local-part" of the email may include the use of any of the ASCII or UNICODE, UNICODE characters and any special characters used must be contained between quotation marks and must also be preceded by a backslash. In addition, the IMF provides that comments may be included in the email address and can be located with parentheses at either end of the local part. For example "johndoe(comment)@example.com" and "(comment)johndoe@example.com" are both equivalent to "johndoe@example.com."

Figure 2:
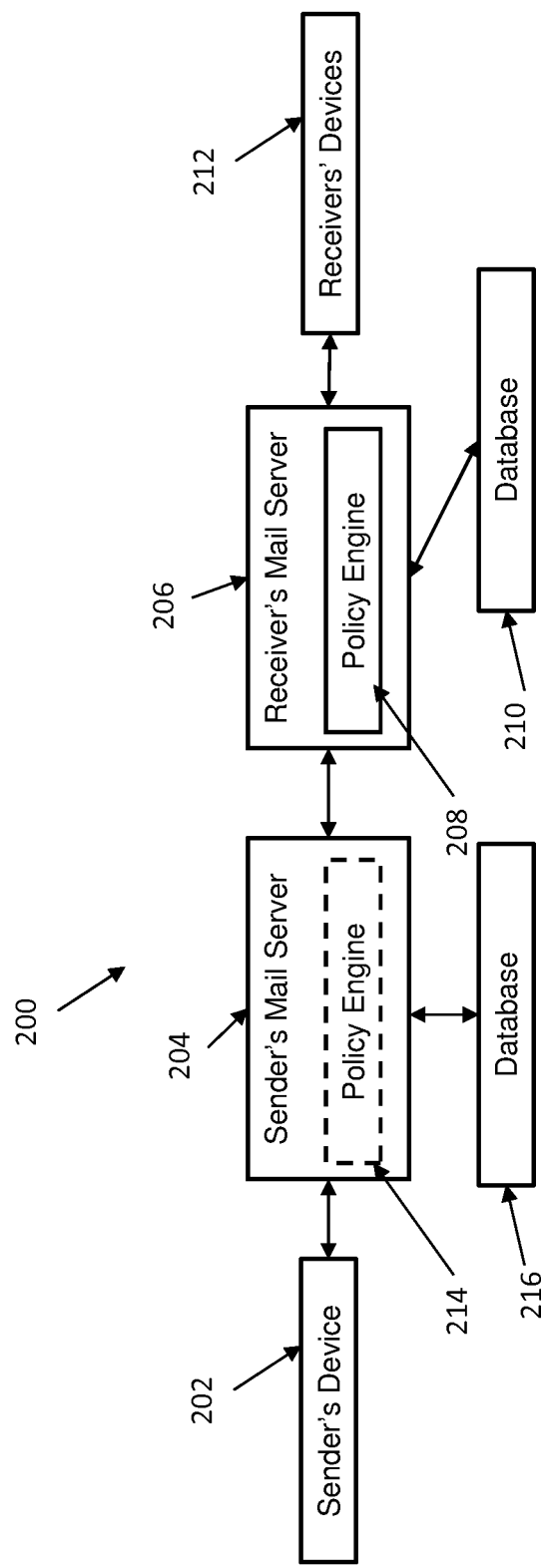
FIG. 2 is a block diagram illustrating a system for processing email having symbolic variables in accordance with an embodiment.

Referring now to FIG. 2, a block diagram illustrating a system 200 for processing email having symbolic variables in the email address in accordance with an embodiment is shown. As illustrated, the system 200 includes a sender's device 202, a sender's mail server 204, a receiver's mail server 206, and a receiver's device 212. During traditional email usage, a sender drafts an email to a recipient and provides an email address for the recipient, for example johndoe@company.com. The sender's device 202 transmits the email to the sender's mail server 204. If the domain of the recipient of the email is not the same as the sender's domain, the sender's mail server 204 transmits the email to the receiver's mail server 206. The receiver's mail server 206 then transmits the email to the receiver's device 212. If the domain of the recipient of the email is the same as the sender's domain, the sender's mail server 204 transmits the email to the receiver's device 212.

In exemplary embodiments, the system 200 is configured to allow a sender to send an email to one or more unknown individuals based on their relationship to a known recipient by including symbolic variables in the email address of the known recipient. In exemplary embodiments, the symbolic variables may be located in the comment field of an email address. For example, the email address "johndoe@company.com" can be modified to "johndoe(symbolic)@company.com." In other embodiments, the symbolic variables may be included in another portion, or field, of the email address. For example, the symbolic variable may be incorporated in email addresses that have extended local or domain names.

In exemplary embodiments, the receiver's email server 206 includes a policy engine 208 that is configured to resolve the symbolic variables included in the email address provided by the sender. In exemplary embodiments, the policy engine 208 is configured to communicate with a database 210 that can be used to look up data needed for resolving the symbolic variables. In exemplary embodiments, the database 210 may be part of the receiver's email server 206 or may be separate from the receiver's email server 206.

In exemplary embodiments, the sender's email server 204 may also include a policy engine 214 that is configured to resolve the symbolic variables included in the email address provided by the sender. In exemplary embodiments, the policy engine 214 is configured to communicate with a database 216 that can be used to look up data needed for resolving the symbolic variables. The policy engine 214 of the sender's email server 204 may be used to resolve the symbolic variables included in the email address when the recipient of the email is within the same domain as the sender, i.e., when the sender and the recipient share the same mail server. In exemplary embodiments, the database 216 may be part of the sender's email server 204 or may be separate from the sender's email server 204.

In exemplary embodiments, the symbolic variables include multiple elements. The elements can include, but are not limited to, address section identification, a control character, and a relationship to the known recipient. In exemplary embodiments, the address section identification is an indication of the section of the email address where the resolved name should appear, i.e., to, cc, bcc.

In exemplary embodiments, the control character is a character used to denote a symbolic process and different control characters will have different meanings. In one embodiment the control character may be an ampersand "&." Since the definition of "&" means the conjunction word "and," the ampersand can be used to indicate that the sender would like to add recipients via a relational alias. In other embodiments, various other control characters may be used.

In exemplary embodiments, the relationship to the known recipient may be an organizational relationship contained in a personnel directory that is stored by the mail server or on a database accessible by the mail server. In addition the relationship could include job roles, skills, or other extended relationships. The relationship to the known recipient can be used to specify the level in the organization the relationship applies and/or whether the relationship is limited to a management chain. In exemplary embodiments, the level can be a number (such as 1 for first line and 2 for second line), a relational number (such as +2 for 2 line organizational levels above the person), or a relational symbol (for instance "<" for all below (default), ">" all above"). In exemplary embodiments, a differentiation between management and organization members can be performed by using a keyword. For example, a manager may be referenced using a keyword of manager, or a short form of MGR or M, and an organization can be referenced using a keyword or organization, or a short form of ORG or O. In exemplary embodiments, since the local name part of an email address including the comment is limited to 64 characters, short forms of keywords may be preferable.

In one embodiment, a sender knows an email address of an intended recipient and wants to send an email to the recipient and wants to copy to the recipient's manager but the sender does not know the manager's name or email address. In this case, the sender inserts symbolic variables into the email address of the known recipient to send the email to the recipient and to his manager, for example "johndoe(&CC:1MGR)@company.com" or "johndoe(&C:1M)@company.com." In another embodiment, to send a copy to the second line manager of the recipient but not the first line the following email address can be used, "johndoe(&CC:2MGR)@company.com." In another embodiment, to send a copy to the first and second line manager of the recipient the following email address can be used, "johndoe(&CC:2>MGR)@company.com" or "johndoe(&C:2>M)@company.com."

In exemplary embodiments, the policy engines 208, 214 are configured to extract the symbolic variables included in an email address and to query databases 210, 216 to identify additional recipients based on the symbolic variables and the email address of the known recipient. Once the policy engines 208, 214 has identified the additional recipients based on the symbolic variables, the engines 208, 214 inserts the email addresses for the additional recipients into the proper address section of the email as specified by the address section identification.

In exemplary embodiments, the policy engines 208, 214 may be configured to perform additional processing based on the symbolic variables in the email address. The additional processing may include further refinements of the selection of recipients using complex, math/set theory combinations of other relational attributes, such as other attributes in the database 210, 216 or a personnel directory stored on the mail server. In exemplary embodiments, these other attributes may include, but are not limited to, job responsibilities, job title, job role, location, experience, qualifications, expertise, biography, certifications, credentials, patents, skills, projects, teams, communities, and professional organizations. In one embodiment, a sender wants to send an email within his own second line organization to everyone who has Java skills. The sender can use the following email address "myself(&TO:2ORG>+SKILLS=JAVA)@company.com" or "myself(&T:2>O+S=JAVA)@company.com."

In exemplary embodiments, the symbolic variables may be entered into an email address in several different ways. For example, the symbolic variables may be entered into an email address by manually typing the symbolic variables, cutting and pasting the symbolic variables or via a graphical interface of the email program that allows for selection of the symbolic variables. Another embodiment would allow entry of a person's name or nickname in the comment area as a starting point for additional filtering. For example, sender can use the following email address to email people whose manager is "manager name" and that have Java skills "myself(&manager name&ORG>+SKILLS=JAVA)@mycompany.com."

In exemplary embodiments, the policy engines 208, 214 may be configured to perform additional processing during the resolution of the symbolic variables. The additional processing may include, but is not limited to, context checking and security verification. In exemplary embodiments, the amount and type of additional processing may depend on whether the relational recipient is within the same domain (intranet/intra-domain) as the sender or not (internet/inter-domain).

In one embodiment, as a sender types an email, an email program can communicate with a mail server to check if a symbolic variable is used and if the recipient is within the same domain, firewall or organization as the email originator. If so, the mail server will perform security or authority checking, to verify that the sender has access to the same information via a personnel look-up program and/or if the request violates any corporate personnel or security policies. If processing is allowed, the policy engine may populate the resolved name(s) prior to the email being sent by the sender. For example, the policy engine may display the resolved email address for an additional recipient to the sender of the email. In other embodiments, the policy engine could, for security reasons, also allow forwarding without populating the list. In exemplary embodiments, the use of symbolic variables provides an easy to use internal automatic look-up mechanism that would eliminate the need for manual searches outside the email program. In intra-domain embodiments, the resolved names from the symbolic variables are not populated prior to sending the email, rather the symbolic variables will be sent as part of the email to the relational recipient. Upon receipt of the email, the receiver's mail server will process the symbolic variables.

In exemplary embodiments, the policy engines 208, 214 are configured to execute one or more security policies to protect against security threats, such as phishing. In one embodiment, the policy engine may be configured to warn a recipient if an email was sent to them as a result of being a resolved address. For example, the policy engine may insert "&RESOLVED_ADDRESS" or "RESOLVED symbolic" in the comment area of the email delivered to the recipients. In one embodiment, the policy engine may be configured to use existing spam controls to block requests. For example, the policy engine may block a person, a domain, a locality, or an IP addresses doing multiple requests, etc. In one embodiment, the policy engine may be configured to disallow symbolic requests as an overall policy.

In one embodiment, the policy engine is configured to insert "RESOLVED_SYMBOLIC" in the comment area of the email delivered to the recipients. For example, assume that a person from outside of an organization sends an email to johndoe(&CC:1MGR)@company.com. The policy engine would resolve the symbolic variable and add the manager, manager(RESOLVED_SYMBOLIC)@company.com, to the email sent to John Doe. If John were to reply to all to the email sent, the person outside of the company may now be able to see the email address of John's manager. In exemplary embodiments, the policy engine is configured to prevent the managers email address from being disclosed in replies to the original message. For example, the policy engine may remove the managers email address, put the managers email address in bcc list, replace the managers email address with an appropriate symbolic variable, or the like.

In one embodiment, when the symbolic variables are resolved, the names of the additional recipients added could be injected into distribution list in a similar fashion as a group name or other alias. In other embodiments, for security reasons the sender of the email, if from outside the firewall or outside the organization, may not be allowed to see if the symbolic variables were resolved or the resolved recipients names.

In exemplary embodiments, the mail server may be configured to use the symbolic variables to automatically post content to a social media service. In one embodiment, a control character of the symbolic variable may be a social network indicator. For example, if the control character is a hashtag symbol, "#," the mail server may be configured to post the email to a specific social network. For example, #FACEBOOK or #FB may result in the contents of the email being posted to the sender's Facebook page. Likewise, #TWITTER or #TW may result in the contents of the email being posted to the sender's Twitter feed. In exemplary embodiments, other control characters may be used to represent other symbolic processes.

In exemplary embodiments, the policy engine of a mail server may be configured to store recent or more popular symbolic variables and associated email address. Accordingly, upon detecting one of the stored symbolic variables, a static versus dynamic (resolved each time the symbolic is used/resend) look-up can be used. In exemplary embodiments, the policy engine may include learning or predictive system to determine which symbolic variables and email addresses to store. In exemplary embodiments, the symbolic variables may also be used by the mail servers to trigger other functional processing in a mail server in addition adding recipients to the email.

Figure 3:
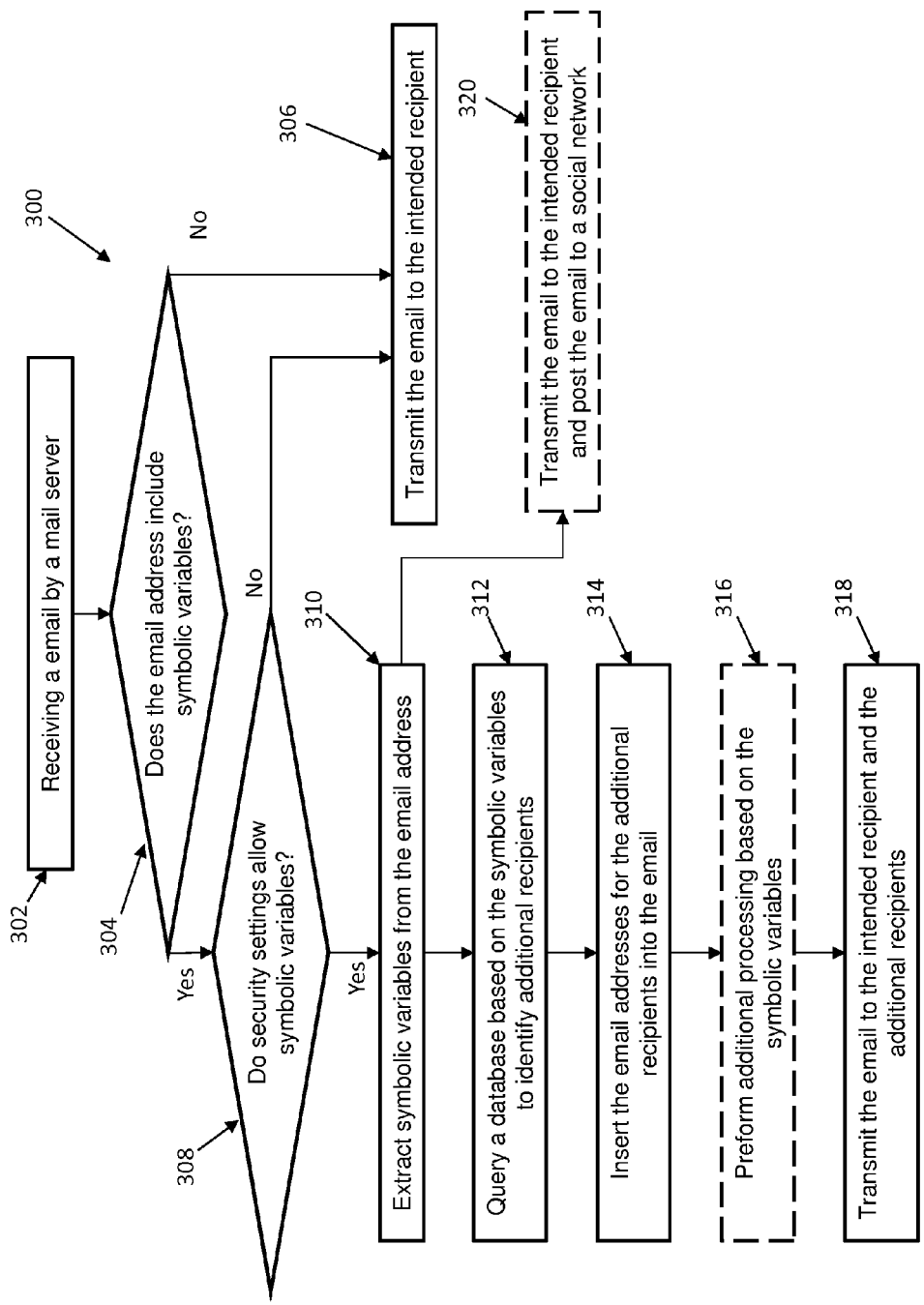
FIG. 3 is a flow diagram illustrating a method for processing email having symbolic variables in accordance with an embodiment.

Referring now to FIG. 3, a flow diagram of a method 300 for processing email having symbolic variables in the email address is shown. As illustrated at block 302, the method 300 includes receiving an email by a mail server. Next, as shown at decision block 304, the method 300 includes determining if the email address of the email includes a symbolic variable. If the email address of the email does not include a symbolic variable, the method 300 proceeds to block 306 and transmits the email to the intended recipient. If the email address of the email does include a symbolic variable, the method 300 proceeds to decision block 308 and determines if the security settings allow the use of symbolic variables. If the security settings allow the use of symbolic variables, the method 300 proceed to block 310 and extracts the symbolic variables from the email address of the intended recipient. If the security settings do not allow the use of symbolic variables, the method 300 proceeds to block 306 and transmits the email to the intended recipient.

Continuing with reference to FIG. 3, as shown at block 312, the method 300 includes querying a database based on the symbolic variables to identify additional recipients. As shown at block 314, the method 300 includes inserting the email addresses for the additional recipients into the email. In one embodiment, the method 300 may include preforming additional processing based on the symbolic variables, as shown at block 316. As shown at block 318, the method 300 includes transmitting the email to the intended recipient and the additional recipients. In one embodiment, the method 300 may include transmit the email to the intended recipient and posting the email to a social network, as shown at block 320.

According to one embodiment, the symbolic variables allow the end user to create entries in electronic distribution list or email group without knowledge of the recipient's name or email address. The end user only needs to know the relationship to an intended recipient. According to another embodiment, complex math set theory combinations of relational attributes can be performed to provide filtering, based on a known or unknown recipient. This allows the end user to quickly locate and contact the correct individual or group without manually using a look-up technique.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A mail server for processing email comprising:
    a processor configured to perform a method comprising:
        receiving an email comprising an email address for an intended recipient;
        determining whether the email address includes a symbolic variable;
        based on determining that the email address includes the symbolic variable:
            extracting, by the processor of the mail server, the symbolic variable from the email address;
            identifying an additional recipient based on the symbolic variable by querying a database based on the symbolic variable, wherein the symbolic variable includes a relationship between the intended recipient wherein the relationship is an organizational relationship contained in a personnel directory that is stored by the mail server or on a database accessible by the mail server and the additional recipient and wherein the email address of the additional recipient is unknown by the sender of the email; and
            transmitting the email to the email address of the intended recipient and the additional recipient;
        based on determining that the email address does not include the symbolic variable, transmitting the email to the email address of the intended recipient,
    wherein the symbolic variable further includes a control character for automatically posting the content of the email to a social network, and
    wherein a policy engine is configured to allow or disallow the inclusion of the symbolic variable in the email address.

2. The mail server for processing email of claim 1, wherein the symbolic variable further includes an address section identification.

3. The mail server for processing email of claim 1, wherein the symbolic variable is located in a comment field of the email address of the intended recipient.

4. The mail server for processing email of claim 1, wherein identifying an additional recipient based on the symbolic variable includes querying a database based on the symbolic variable.

5. The mail server for processing email of claim 4, wherein the database is disposed on the mail server.

* * * * *